219-121 SR
MTR04 XR 3,206,336
[redacted]
Sept. 14, 1965 H. HORA 3,206,336
METHOD OF TRANSFORMING N-TYPE SEMICONDUCTOR
MATERIAL INTO P-TYPE SEMICONDUCTOR MATERIAL
Filed March 27, 1962
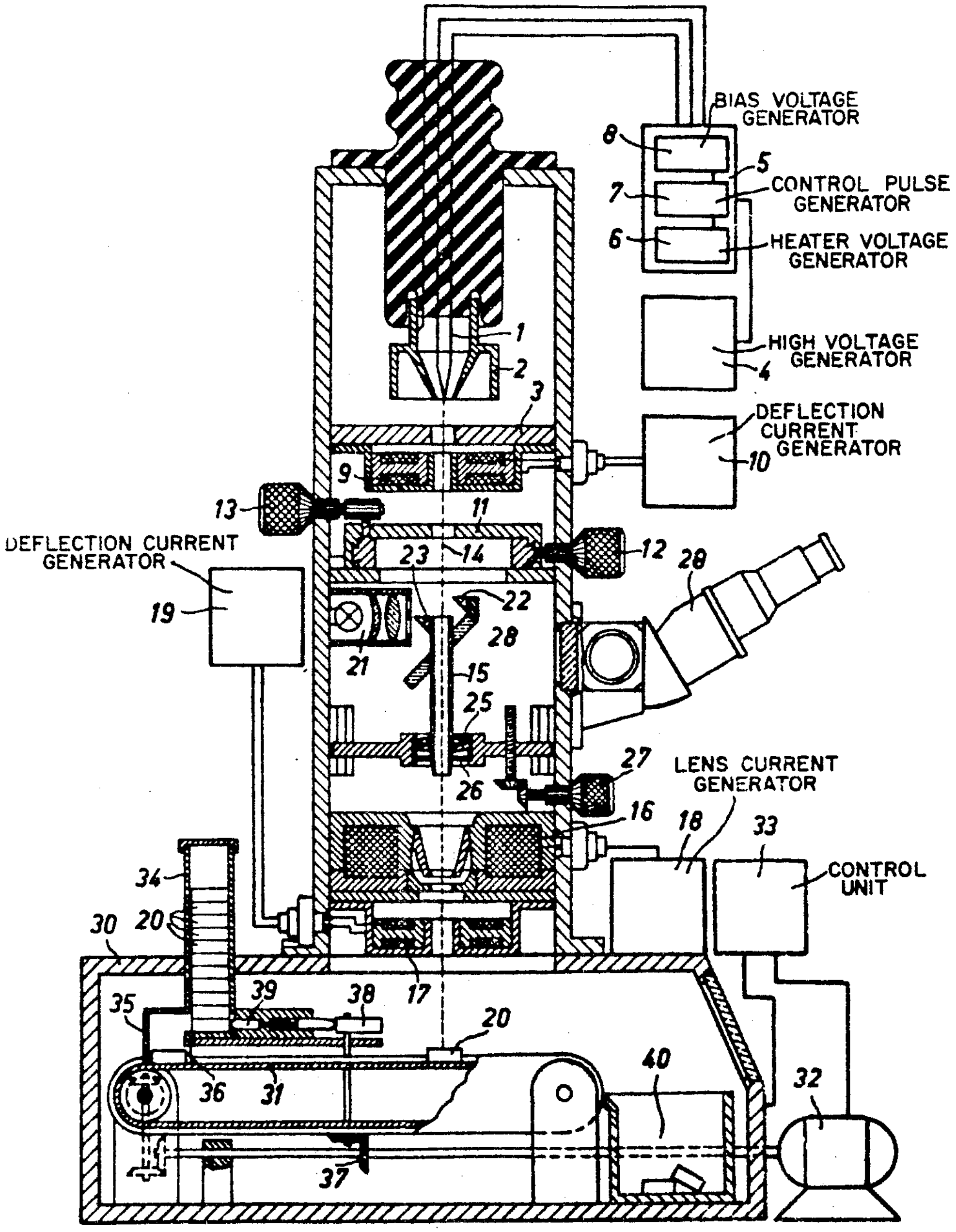

United States Patent Office 3,206,336
Patented Sept. 14, 1965

3,206,336
METHOD OF TRANSFORMING N-TYPE SEMICONDUCTOR MATERIAL INTO P-TYPE SEMICONDUCTOR MATERIAL

Heinrich Hora, Boeblingen, Wurttemberg, Germany, assignor, by mesne assignments, to United Aircraft Corporation, East Hartford, Conn., a corporation of Delaware Filed Mar. 27, 1962, Ser. No. 182,817
Claims priority, application Germany, Mar. 30, 1961, Z 8,650
4 Claims. (Cl. 148—1.5)

This invention relates to an improved method for the conversion of n-type semiconductor material into p-type semiconductor material by an impinging electron beam.

In the manufacture of semiconductor components for the electronic industry, it is at times necessary to convert semiconductor material of n-type conductivity into semiconductor material of p-type conductivity. Doping of the semiconductor is, of course, known to the art. However, doping at specific locations involves mechanical micro-manipulation which must be carried out very carefully and which requires a relatively large amount of time.

The change in the concentration of the excess charge carriers in an n-conductive semiconductor material without the introduction of other types of atoms is possible by the production of grid holes. Thus, acceptor impurities can be produced by atoms removed from a lattice site (Frenkel defect). In order to produce such defects which change the concentration of the excess charge carriers in semiconductors in favor of p-conductivity, it is known to bombard semiconductor material with charge carriers (electrons, neutrons, atomic nuclei) which have an energy of 0.5 to 20 mev. In corresponding investigations, it was found that in the case of germanium, for instance, the bombarding electron should have a minimum energy of 500 kev.

Use of electrons having an energy of more than 500 kev. in order to vary the concentration of excess charge carriers and semiconductors is very costly, since expensive electron accelerators or special generators are necessary for this.

The method of the present invention serves to transform n-conductive semiconductor material into p-conductive material without the introduction of any material. This method is characterized by the fact that the place of the material to be converted is bombarded with electrons having an energy range of between 30 and 200 kev. in an electron-beam dose of $10^{16}$ to $10^{22}$ electrons per $cm.^2$. With such bombardment, a permanent change in the concentration of the excess carriers actually occurs, contrary to the view gained from the previous investigations.

Electrons which have energies of between 30 and 200 kev. can be produced in industrial electron beam devices of relatively simple construction. The electron beams produced in such devices can be focussed and deflected by electron-optical means, so that it is possible, for example, to concentrate such an electron beam on a very small region of a semiconductor. It is, thus, possible to limit the transformation of n-conductivity to p-conductivity to extremely small regions of a semiconductor.

The bombardment of the semiconductor material is preferably effected in vacuum. In this way, all contamination is avoided from the very start.

It may be advisable to vary the intensity of the electron beam during the irradiating. It may in particular be advantageous to control the electron beam intermittently in order to avoid excess temperature rise of the irradiated material.

In order to transform predetermined regions of a semiconductor, it is advisable to conduct the electron beam in a predetermined manner over the place of the material which is to be converted.

The new method can be used with great advantage both for the production of rectifiers and for the production of transistors. In the latter case, it is necessary for instance when irradiating a semiconductor single-crystal wafer, first of all to expose one side to the electron beam and then after a sufficiently large region of the material has been converted, bombarding the opposite side of the semiconductor. In this way, an n-p-n transistor is obtained.

In order to be able to obtain continuous radiation of the largest possible number of semiconductors one after the other, it is advisable to provide in the work space of the known electron beam apparatus a conveyor device which moves a plurality of semiconductors arranged in a magazine one after the other to the point of incidence of the beam.

The invention will be described in further detail below with reference to the accompanying drawing which is a cross sectioned view of a preferred embodiment of this invention.

In the drawing, there is shown a beam generating system comprising a cathode 1, control cylinder 2 and a grounded anode 3. The source 4 generates a high voltage, of for example 50 kv., this voltage being fed by a high voltage cable provided with a grounded jacket to the biasing network 5. This network consists of a device 6 for producing the adjustable heater voltage, a device 7 for producing control pulses and a device 8 for producing the adjustable control-cylinder bias voltage. These voltages are fed via a high voltage cable to the beam generating system to provide the heater current for cathode 1, and the bias and control pulses for the control cylinder 2. A deflection system 9 is provided below the anode (looking in the direction of the beam), which serves to adjust initial position of impingement of the electron beam. The generator 10 supplies current to the deflection system 9.

Below the deflection system 9, there is arranged a diaphragm 11 which can be moved in the plane of the paper and at right angles thereto by means of the knobs 12 and 13. After the pulsed electron beam 14 has been adjusted, it passes through a grounded tube 15 and is focussed by the electromagnetic lens 16 onto the workpiece 20.

Below the electromagnetic lens 16, there is positioned a deflection system 17 to controllably deflect the electron beam in accordance with the current amplitude supplied to the system by generators 18 and 19.

To observe the irradiating process, there is provided an optical system which permits microscopic direct-light illumination of the workpiece 20. This system consists of an illuminating system 21 which supplies light having parallel rays. This light is reflected by two metallic prisms 22 and 23 onto a lense 25 which can be displaced in axial direction to focus the light onto the workpiece 20. Below the lense 25, there is a replaceable glass plate 26 which protects the lens 25 from any contamination such as material evaporated from the work. The lens 25 is moved together with the glass plate 26 in axial direction by the knob 27.

The light emitted by or reflected from the surface of the workpiece 20 is focussed to a parallel ray beam by the lens 25 and deflected by the mirror 28 into the observation system 29, developed as a stereomicroscope.

In the working space 30, there is arranged an endless belt 31 provided with lateral guides which are moved by the electric motor 23 in accordance with the commands supplied by a control unit 33.

A magazine 34 contains a plurality of workpieces 20 made of semiconductive material. Alongside the magazine 34, there is arranged a tube 35, which contains an opening 36 in the lower end thereof.

By means of the electric motor 32, an eccentric disk 38 is rotated via bevel gear 37. As the lobe of the cam engages the bolt, the bolt 39 is advanced, pushing a workpiece 20 out of the magazine 34 into the tube 35. In this tube, the workpiece 20 drops onto the belt 31 and is moved by said belt out of the opening 36 to the point of impingement of the electron beam 14. After bombardment of the workpiece 20, the belt 31 is advanced further and the treated workpiece 20 drops into a collecting container 40.

The control unit 33 is so developed that a workpiece 20, after being ejected from the magazine 34 is moved by the belt 31 to the point of impingement of the electron beam 14. The belt 31 is then stopped for a period of time which corresponds to the time of irradiation which has been previously set. At the end of this time, the electric motor 32 is again energized and the finished workpiece 20 passes into the collector 40, while at the same time a new workpiece is moved to the point of impingement of the electron beam.

The treated workpieces 20 are removed from the working space 30. Thereupon, the workpieces are cleaned, for instance with acetone, and contacts applied. The workpieces which have been treated in this manner can then be used as rectifiers.

For the production of barrier transistors, the surface of the semiconductor is treated, the semiconductor flipped over, and the other surface treated to give an n-p-n transistor.

The bias voltages and heater current applied to the electron beam generating system are so selected that, on the average, an electron beam 14 produced thereby has a power density of about 10 watts per $cm.^2$.

When irradiating silicon single crystals in the form of small blocks to bombarding with electrons of an energy of 50 kev. to 75 kev. and with an electron beam dose of $9\times10^{16}$ electrons per $cm.^2$, a rectifier was obtained as the end product. Therefore, the original n-conductive silicon had been converted into p-conductive silicon in a layer, the thickness of which corresponds essentially to the depth of penetration of the electron beam 14. For this transformation, the working time is so selected (about 90 seconds) that one avoids heating the semiconductor material to temperatures above the temperature at which the Frenkel defects previously produced by the bombardment are done away in the material by thermal processes. If the irradiated specimen which has been already converted in the irradiated layer into p-conductive material is subsequently so irradiated that its temperature rises to above 500° C., the transformation of n-conductivity into p-conductivity is again wiped out.

It is often found advantageous to pulse the beam in periodic fashion. The beam may be deflected between pulses to effect greater control over the surface temperature conditions.

If in the arrangement shown in the figures, the electron beam 14 is moved by the deflection system 17 over the surface of the workpiece, transformation of the conductivity can be effected for instance along a large variety of predeterminable lines. Thus, circuit construction on the crystal face is possible.

This invention may be variously embodied and modified within the scope of the subjoined claims.

What is claimed is:

1. The method of transforming n-conductive semi-conductor material into p-conductive semiconductive material which consists of the steps of generating a beam of electrons having an energy range of between 30 and 200 kev. focussing said beam at a first location on a body of semiconductor material where a transformation is to be accomplished, limiting the time of impingement of the beam on said first location such that a dose of $10^{16}$ to $10^{22}$ electrons per centimeter squared is imparted thereto and producing relative movement between the normal axis of the electron beam and the body of semiconductor material such that transformations may be effected serially at a plurality of points.

2. The method according to claim 1, which includes the step of moving the electron beam in a predetermined manner over the said location of the material to be transformed.

3. The method according to claim 1, which includes the step of coupling contacts to the bombarded material to form a rectifier.

4. The method according to claim 1, in which one side of the semiconductor material is treated, and which includes the additional step of treating the other side of the material by bombardment to form an n-p-n transistor.

References Cited by the Examiner

UNITED STATES PATENTS

| | | | |
|---|---|---|---|
| 2,666,814 | 1/54 | Shockley | 148—1.5 |
| 2,743,200 | 4/56 | Hannay | 148—1.5 |
| 2,750,541 | 5/56 | Ohl | 250—49.5 |
| 2,771,568 | 11/56 | Steigerwald | 148—1.5 |
| 2,778,926 | 1/57 | Schneider | 148—1.5 |
| 2,803,569 | 8/57 | Jacobs | 148—1.5 |
| 2,860,251 | 11/58 | Pakswer et al. | 250—49.5 |
| 2,868,988 | 1/59 | Miller | 148—1.5 |
| 2,883,544 | 4/59 | Robinson | 250—49.5 |
| 2,910,394 | 10/59 | Scott | 148—1.5 |
| 2,944,172 | 7/60 | Opitz et al. | 250—49.5 |
| 2,968,723 | 1/61 | Steigerwald | 250—49.5 |
| 2,989,385 | 6/61 | Gianola | 148—1.5 |
| 3,049,608 | 8/62 | Greene | 219—117 |
| 3,118,050 | 1/64 | Hetherington | 219—117 |

OTHER REFERENCES

Journal of Applied Physics, vol. 30, pages 1235–1238, August 1959, "High Energy Electron Irradiation of Ge and Te," by Victor A. J. Van Lint and Harold Roth.

Physical Review, vol. 105, March 15, 1957, pages 1705–1730, "Energy Levels in Electron" Bombarded Silicon by G. K. Werthum.

DAVID L. RECK, *Primary Examiner.*

RALPH G. NILSON, HYLAND BIZOT, *Examiners.*